Aug. 15, 1933.  N. A. KRISTMAN  1,922,702

BAIT HOLDER

Filed April 1, 1931

INVENTOR.
Nicholas A. Kristman.
BY
Townsend Loftus & Abbett.
ATTORNEYS.

Patented Aug. 15, 1933

1,922,702

UNITED STATES PATENT OFFICE 1,922,702

BAIT HOLDER

Nicholas A. Kristman, Menlo Park, Calif.

Application April 1, 1931. Serial No. 526,802

3 Claims. (Cl. 43—131)

This invention relates to a bait holder, and especially to a holder which is adapted to contain a poisoned bait for the destruction of insects, such as ants, etc.

The object of the present invention is generally to improve and simplify the construction and operation of bait holders of the character described; to provide a bait holder which presents a comparatively large base so that the holder will be substantially non-tipping and will assume an upright position wherever it is placed; to provide a bait holder having a cover portion to prevent animals and small children from getting at the poisoned bait; to provide a cover which will retain the bait in the case of accidental overturning of the bait holder; to provide a cover which prevents the entrance of water during rain or when sprinkling a garden; to provide a cover which permits the entrance of ants and like insects; to provide a cover which is adapted to be interlocked with the holder but which may be readily removed when the holder is to be refilled; to provide a bait holder which is adapted for the reception of any kind of bait, whether liquid, syrup or otherwise; and further to provide a bait holder having a plurality of ventilating openings formed in the base thereof to permit free circulation of air so as to keep the bait as cool as possible, thereby preventing crystallization of syrup baits and the evaporation of liquid baits.

The bait holder is shown by way of illustration in the accompanying drawing, in which—

Figure 1:
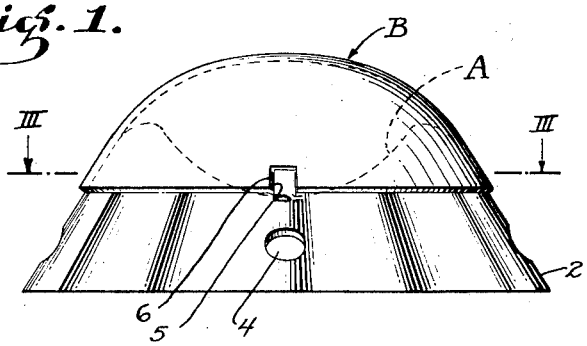
Fig. 1 is a side elevation of the bait holder.
Figure 2:
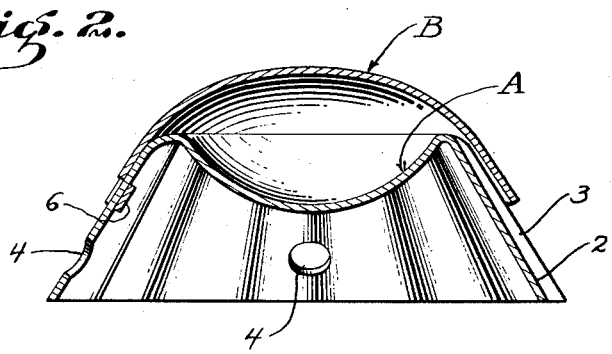
Fig. 2 is a central, vertical section of the same.

Referring to the drawing in detail, and particularly Figs. 1 and 2, A indicates a comparatively shallow dish-shaped container, on the outer edge of which is formed an annular downwardly turned flaring flange 2. This flange forms a cone-shaped support or base for the container. It is low and presents such a large area, in proportion to the container, that accidental overturning is substantially prevented. The annular flange is corrugated, as indicated at 3, to provide a plurality of grooves or passages whereby ants or like insects may readily enter; and the flange is also provided with a plurality of openings, such as indicated at 4, the function of which will hereinafter be described.

In order to protect the contents of the container a cover member, generally indicated at B, is employed. This cover is substantially semispherical in shape and extends downwardly over the annular flange 2, as shown, and is supported by the high points of the corrugations 3. Any suitable means may be employed whereby accidental removal of the cover may be prevented.

Figure 3:
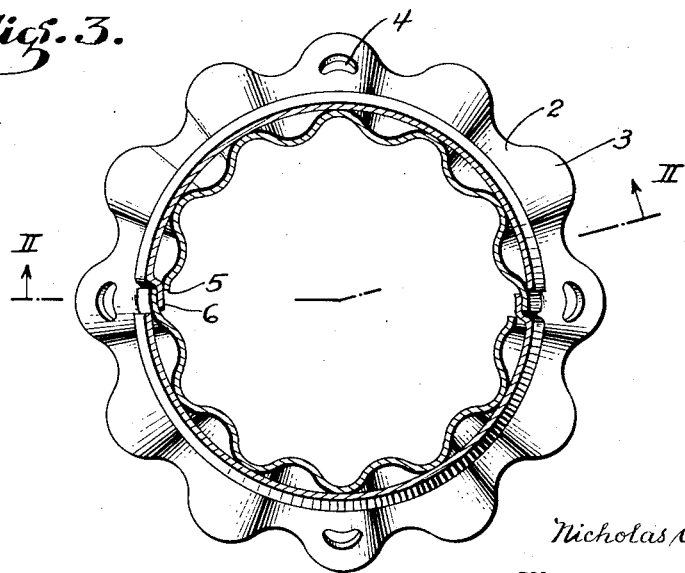
Fig. 3 is a horizontal section, taken on the line III—III of Fig. 1.

In the present instance a pair of keepers is formed on opposite sides of the flange at the high points of the corrugations, the keepers being formed by slotting the metal, as indicated at 5. Formed on the lower edge of the cover member is a pair of inwardly bent tongues or lugs 6, and when the cover is placed on the container and slightly rotated the tongues will enter the keepers, as shown in Fig. 3, and thus form an interlock between the container and the cover which prevents accidental removal of the same when in use and also prevents small children or prowling animals from getting at the poisoned bait placed within the container.

In actual practice, the container and the cover may be made by punch and die operations from sheet metal and the like and the parts may be galvanized or otherwise protected. The poisoned bait, whether in the form of a syrup or a liquid, is placed in the dish-shaped container A, the cover is applied and the tongues 6 are interlocked with the keepers 5. With the cover in position the container or bait holder may be placed on the floor, on shelves in a building, or placed in the garden or around the house as desired. Due to the large supporting area provided by the flaring flange or base member 2 accidental upsetting is substantially prevented. Prowling animals, such as dogs and cats, cannot get at the bait as it is completely enclosed by the cover B. If small children, animals, or, in fact, anyone, should accidentally overturn the bait holder apparently little, if any, of the bait will be spilled as the semispherical shape of the cover B will act as a secondary container and will hold the bait against removal.

The lower edge of the cover rests on the high points of the corrugations 3. Ample space is thus left between the low points of the corrugations and the lower edge of the cover to permit free entrance of ants and like insects at all points around the container. The container is squatty and low in construction and, as previously stated, is not readily overturned or upset. In fact, a garden hose can be dragged over the bait holder without any danger of upsetting the same, and it may be accidentally kicked or stepped upon without any material injury to the bait holder, as it is rigid and substantial in construction. Water in the form of rain or a spray when sprinkling the garden will not enter and the bait holder may, therefore, be placed wherever convenient.

The openings, indicated at 4, which are formed in the annular flange 2, are of considerable importance as they permit a free circulation of air through the base beneath the container A. Such circulation tends to keep the container cool, thereby preventing crystallization of poisoned bait in the form of a syrup, solution or the like, and if a liquid solution is used evaporation thereof is substantially prevented. Any suitable form of bait may be placed in the container, whether it be in the form of syrup, liquid, powder or in any other form.

While certain features of the present invention are more or less specifically described, I wish it understood that various changes may be resorted to within the scope of the appended claims. I also wish it understood that the materials and finish of the several parts employed may be such as the manufacturer may decide or varying conditions or uses may demand.

It should also be noted that due to the fact that the cover is readily removable it is possible to maintain the container in a sanitary condition as with the cover removed the container can be easily washed and scalded so that the syrup bait will not have any tendency to ferment.

What I claim is:

1. A bait holder comprising a dish-shaped container for the reception of bait, a downwardly flaring annular flange formed on the edge of the dish, said flange forming a support and base for the dish, a cover member for the dish, means normally securing the cover against removal, and a plurality of openings formed in the base flange to permit a free circulation of air to retain the container in a cool condition.

2. A bait holder comprising a dish-shaped container for the reception of bait, a downwardly flaring annular flange formed on the edge of the dish, said flange forming a support and base for the dish, a substantially semispherical-shaped member forming a cover for the container and extending downwardly over the flaring base flange, a plurality of keepers formed on the base flange, and a plurality of interlocking members formed on the cover and engageable with the keepers to secure the cover against removal.

3. A bait holder, comprising a container for the reception of bait, and a flange on the container forming a support and base therefor, said flange being provided with perforations to permit circulation of air about the exterior of said container.

NICHOLAS A. KRISTMAN.